May 21, 1935.  A. W. SEYFRIED  2,001,799
ELECTRIC MOTOR
Filed Aug. 5, 1931    2 Sheets-Sheet 2
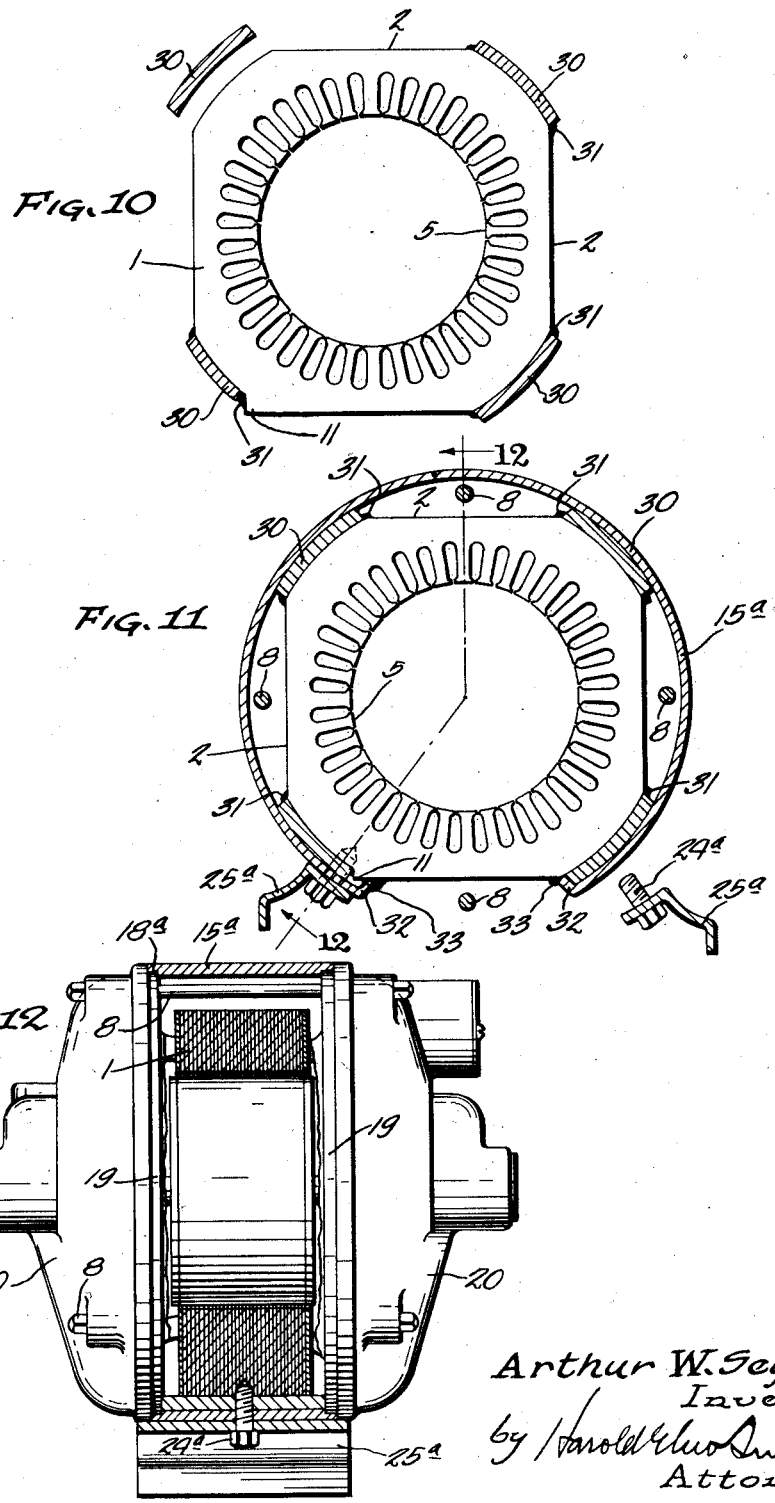

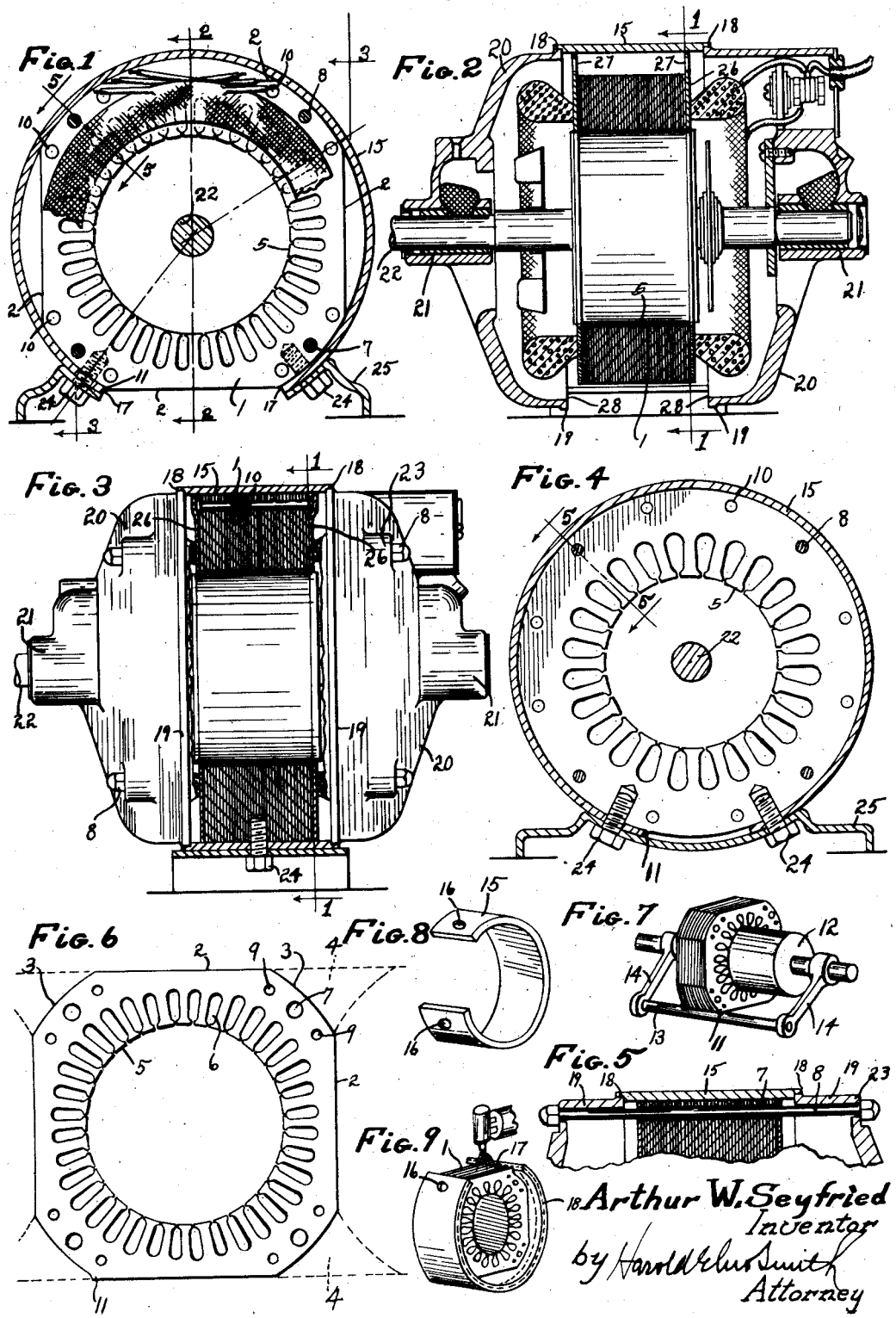

Patented May 21, 1935

2,001,799

UNITED STATES PATENT OFFICE 2,001,799

ELECTRIC MOTOR

Arthur W. Seyfried, Cleveland Heights, Ohio, assignor to The Apex Electrical Manufacturing Company, Cleveland, Ohio, a corporation of Ohio Application August 5, 1931, Serial No. 555,192

9 Claims. (Cl. 172—36)

This invention relates to dynamo electric machines, as exemplified especially in small size electric motors designed to operate small machinery. The objects of the invention are the provision of an improved structure and process of construction which shall effect a substantial economy in waste, cost, weight, and labor; the provision of a dynamo electric machine having a new type of shell and assembly; the provision of a new and improved type of lamination for dynamo-electric machines having a smaller flux density through the use of laminations of relatively large effective area as compared with the amount of stock material required in their fabrication, enabling the use of a cheaper grade of metal and with less waste in punching; the making of a lower cost motor; while further objects and advantages of the invention will become apparent as the description proceeds.

In the drawings accompanying and forming a part of this application I have shown certain physical forms in which my inventive idea is embodied, although it will be understood that these are chosen merely to illustrate the general principles of my invention, and not with any restrictive intent. Fig. 1 is a cross-sectional view through the motor at one end of the field corresponding to the line 1—1 of Figs. 2 and 3; Figs. 2 and 3 are sectional views corresponding to the line 2—2 and line 3—3 respectively of Fig. 1; Fig. 4 is a vertical sectional view similar to Fig. 1 but showing a modified shape of field laminations; Fig. 5 is a detail view corresponding to the line 5—5 of Figs. 1 and 4; Fig. 6 is a plan view of a preferred type of field lamination; Fig. 7 is a perspective view drawn to reduced scale showing the preferred mode of assembling the laminations; Fig. 8 is a perspective view likewise drawn to reduced scale of the embracing-band prior to its application to the field; Fig. 9 is a perspective view showing the preferred process of securing the laminations together and to the band; Fig. 10 illustrates an alternative form of construction; Fig. 11 shows the form of construction in Fig. 10 further advanced; and Fig. 12 is a sectional view on the broken line 12—12 of Fig. 11.

The present improvements relate to the stationary electro-magnetic member ordinarily called the field or stator. This member is customarily built up of laminations of a metal of high magnetic permeability, these laminations being cut by punching in dies with a punch-press. According to customary practice these laminations are then assembled to form a pile of the requisite height, suitably secured together, and then pressed into the previously shaped interior recess of a frame, generally made of cast iron, and having its ends suitably machined for the reception of end-flanges in which the armature shaft is journaled. This means, in effect, that the field laminations are aligned primarily with respect to their external margins, the internal margins being inaccurate by whatever amount the dies are inaccurate or off-center; and while this is not a large amount in the case of die stampings, it is sufficient so that in order to obtain an accurate centering of the armature combined with the smallest permissible air gap, it is necessary to bore or grind out the interior of each stator after the insertion of the laminations into the frame.

The field laminations are assembled with reference, not to their exterior edges, but to their internal edges; instead of providing a frame by which the laminations are supported, the laminations are employed as a foundation or a support for a band-like member which is secured thereto, whereby the end-bells are supported with reference to the opening through the field laminations; and added to these, I preferably employ such a shape of lamination as greatly to decrease the waste of metal in the cutting of the same, this saving amounting to several cents on each motor, even of small size.

In the quantity-punching of blanks from a sheet it is necessary to leave a certain amount of metal completely surrounding each cut in order that the blank may be properly supported and distortion prevented, with the result that considerable loss of metal is produced; but it is possible to shear straight strips of metal without waste since each portion cut off constitutes the support for the adjacent portion. Accordingly I make my laminations 1 with straight parallel sides 2—2 which are cut in succession from a long strip of exactly the requisite width as shown in Fig. 6, the corners only being trimmed off as shown at 3 so as to produce laminations the shape of a square, whose corners are rounded upon an arc more or less nearly concentric with the square. This entails a loss only of the small triangular pieces indicated at 4, and, of course, of the circular blanks punched out of the interior 5 of each lamination and the small recesses 6 for the wires. Adjacent to each of the rounded corners each lamination of the form shown in Figs. 1 to 6 is formed with three apertures, the central aperture 7 being provided for the long bolts 8 hereafter described, and the two outside apertures 9—9 being designed for the reception of rivets 10. Preferably also each lamination is provided at one point with a single small out-standing projection 11 which extends radially outwardly beyond the perimeter of the circle which defines the corners 3 and hence beyond any other part of the lamination. Since this comes from the portion otherwise wasted no added metal is required.

These laminations are then assembled face to face upon a cylindrical mandrel 12, as shown in idealized form in Fig. 7, and associated with this mandrel and mounted so as to swing therearound upon a circle upon an arc concentric with the axis thereof is a suitable bar 13, here indicated as carried by arms 14, although the mode of mounting this bar or its equivalent is very variable. Merely by swinging this bar around the pile of laminations, all the same are brought into line as shown in Fig. 7, with the line defined by these projections 11 parallel to the common axis of the apertures 5, and the different apertures 7 and 9 also in alignment. The rivets 10 are then inserted in their proper apertures and suitably headed over.

A sheet-metal band 15, previously formed to define the major portion of a cylinder, is then placed around the piled laminations so as to embrace tightly the four rounded corners thereof while leaving one of the flat sides exposed as shown in Figs. 1 and 9. Each end of this band has preferably been provided previously with a radial hole 16 which facilitates the clamping of the band about the laminations, and also has another use hereafter explained. The laminations are then welded to each other and to the open edges of the band 15 as shown at 17. This renders the entire assemblage rigid and relatively immovable. The laminations having been similarly punched and assembled on a mandrel according to the aperture 5 therethrough, the resulting opening through the pile is smooth and accurate.

This pile is next placed in a lathe or similar machine and the end portions rabbeted as shown at 18 for the reception of the circular flanges 19 of the end-bells 20—20. These end-bells 20—20 also carry the bearings 21—21 for the armature shaft 22 but the remaining features of the same are immaterial to the present invention excepting that each is provided with a suitable shoulder or seat 23 for the reception of the bolts 8. The laminations are also drilled and tapped radially through the apertures 11 for the reception of screws 24 by which the assemblage is mounted on the pressed steel base member 25. The location of the end-bells is determined entirely by the shape and position of the rabbets 18, and this being determined in accordance with the apertures through the laminations, no machining of the latter is necessary.

In addition to the mechanical advantages and the advantages of lower costs resulting from forming the punchings in the manner disclosed in Figures 1 and 6, certain electrical advantages also naturally result from this form of stator construction which make it possible to weld the stator laminations to each other and to supporting members. The use of welding on stator laminations is ordinarily avoided for the reason that the weld provides a conductor path for eddy currents with the result of harmful heating effects and a marked decrease in the efficiency of the motor. By increasing the amount of metal in certain portions of the stator, as for example at the four corners of the stator shown in Figure 1, the stator is provided with four regions of relatively low flux density as compared with the remainder of the stator and by reason of this fact it is possible to weld the laminations to each other in such low flux density regions without setting up a condition whereby harmful eddy currents will be generated in the operation of the device. The currents that are produced, are by reason of the low flux density in such portions of the stator, of such low value as to be unimportant in a motor of the type disclosed.

Preferably the straight margins of the laminations are spaced from the internal surface of the embracing band forming pockets; but I have found it desirable to close these pockets, and this I preferably accomplish by introducing annular terminal plates 26 of some stiff non-metallic insulating material such as fiber.

When the stator laminations are square as shown in Figs. 1 and 6, or otherwise multi-lateral these circular terminal plates serve to close the passageways which would otherwise exist at these points. This exhibits some advantage during the coating or lacquering or enameling operation, since it is desirable to effect this by immersing the entire assemblage in a vat of hot enamel. Closing these apertures prevents the enamel from covering the surfaces thereof and hence leaves the motor in better heat-dissipating condition than otherwise. After the enameling has been completed it is possible to drill holes through these end-plates as shown at 27 (Fig. 2) in the event that air circulation be desired. When the band 15 constitutes less than a complete circle, the seats 18 of the end-bells are also discontinuous, leaving further apertures shown at 28—28 which can also be utilized for ventilation purposes.

In the modification shown in Figs. 10, 11, and 12, the metal band 15$^a$, instead of being applied directly around the edges of the laminations, is applied to the surface of the corner-bars 30, 30 previously applied to the laminations and welded to the edges thereof along the longitudinal seams 31, 31. The band is lapped about two of these corner-bars as shown at 32 and welded in place along the seams 33, 33. The feet 25$^a$, 25$^a$ are then secured in place by bolts 24$^a$ traversing the band and screwed into the corner-bars. Preferably the bars are curved transversely on the same arc as the band. In Fig. 12 I have shown the end-bells as rabbeted to engage the band; either or both may be machined. In general the last described arrangement is preferable for larger motors, while the first described arrangement is ordinarily sufficient for smaller-sized motors. However, even for small motors the arrangement shown in Figs. 10, 11, and 12 offers the advantage that rivet-holes and bolt-holes may be eliminated, the bolts 8 for securing the end-bells passing through the spaces left between the outside band and the edges of the laminations, the projecting portions of the band 15$^a$ being circularly rabbeted as shown at 18$^a$ for the reception of the circular flanges 19 of the end-bells which are shown at 20. The weld seams need not touch every lamination by any means but only enough to obtain strength and rigidity.

I do not, however, limit myself to the use of non-circular punchings. My improvements exhibit substantial value as applied to circular punchings as shown in Fig. 4; although the waste of cutting complete circles is much greater than that of cutting the square-sided blanks shown in Fig. 6.

It will be understood that for purposes of simplicity I have set forth in these examples several improvements, capable of conjoint use and also capable of independent use and also capable of considerable modification. For example the assembling of the punchings by reference to their internal margins can be performed without employing the external protuberance, so that the latter is not a criterion of my invention excepting in those particular claims wherein it is specifically recited. Likewise this protuberance while shown at 11 in Figs. 10 and 11 is not essential to other features shown in those views. Likewise the discontinuous nature of the external band, while desirable, is not imperative provided only that some radial access be given therethrough to enable the welding or other adequate securing of the laminations thereto. Many other modifications of these specific forms can be made and I do not limit myself in any wise except as specifically recited in my several claims which I desire may be construed each independently of limitations contained in other claims.

Having thus described my invention what I claim is:

1. Process of making dynamo electric machines with laminated stators, characterized by forming the stator punchings each with a single projection on its outer periphery, assembling said punchings with said projections in a straight line, and securing the assembly in an external member which is arranged at one side to provide a stop for said projections.

2. A stator consisting of assembled laminations, and an exterior shell of flexible metal circumferentially tensioned about the same in tightly embracing relation and united with the individual laminations of the stator.

3. A dynamo electric machine comprising a stator made up of assembled punchings and an outer member subtending and closely embracing more than 180° and less than 360° of the same, seams of weld metal securing the punchings to said outer member and to each other, and a base member secured to said outer member.

4. A dynamo electric machine comprising a stator made up of assembled punchings and an outer member subtending and closely embracing more than 180° and less than 360° of the same, seams of well metal securing the punchings to said outer member and to each other, and feet secured to said outer member at opposite sides of said gap defined by the spaced ends of said outer member.

5. A dynamo electric machine comprising a stator made up of assembled punchings and an outer member subtending and closely embracing more than 180° and less than 360° of the same, means rigidly bonding the punchings to said outer member and to each other, seats formed in said outer member coaxial with said punchings, and end bells secured in said seats.

6. A dynamo electric machine comprising a stator made up of assembled punchings and an outer member partially surrounding the same and tightly secured thereto, the extremities of said outer member spaced apart to expose a portion of each punching and said outer member having radial holes therein adjacent to said extremities.

7. A dynamo electric machine comprising a stator made up of assembled punchings and an outer member closely embracing the assemblage, said outer member having spaced ends exposing the edges of the punchings, and the edges of said punchings welded to each other and to the ends of said outer member.

8. A stator for dynamo electric machines comprising a plurality of sheet metal laminations each of which has opposite sides parallel and other sides perpendicular thereto and rounded corner portions between adjacent sides, one corner portion of each lamination having a projection and the projections of all said laminations being located in a straight line which is parallel to the axis of the stator whereby the stator laminations may be accurately and quickly aligned with respect to each other.

9. A lamination for the stator of a dynamo electric machine consisting of an annular sheet-metal stamping, the exterior of which has rounded corners substantially concentric with the central aperture and straight portions between adjacent corners, said straight portions defining a rectangle, one corner portion of said lamination having an integral projection lying in the plane of said lamination and projecting beyond the circle defined by the remaining corner portions whereby the stator laminations may be accurately and quickly aligned with respect to each other.

ARTHUR W. SEYFRIED.